Nov. 20, 1945.  F. J. ZORC, JR  2,389,338
BOAT LAUNCHING TRAILER
Filed Feb. 26, 1945  4 Sheets-Sheet 1
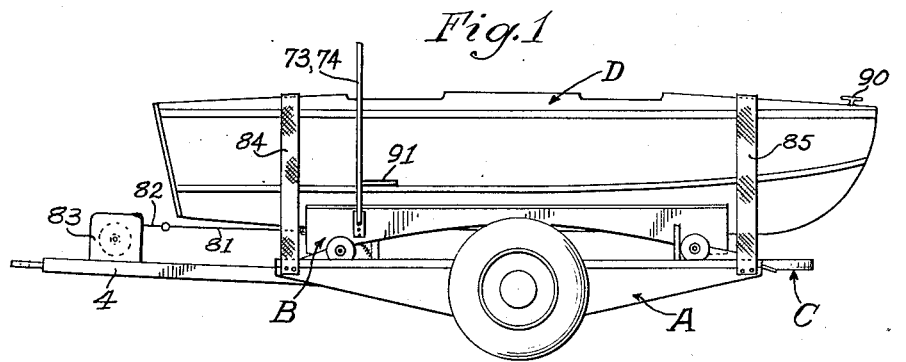
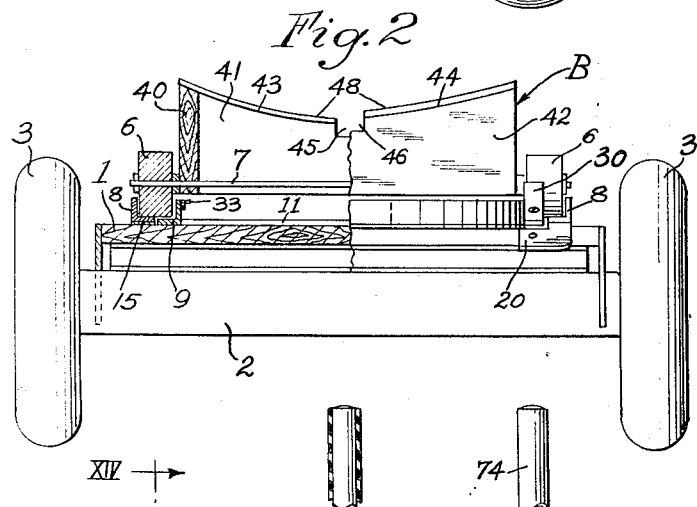
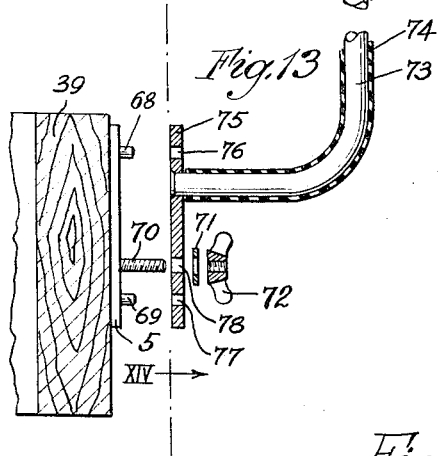
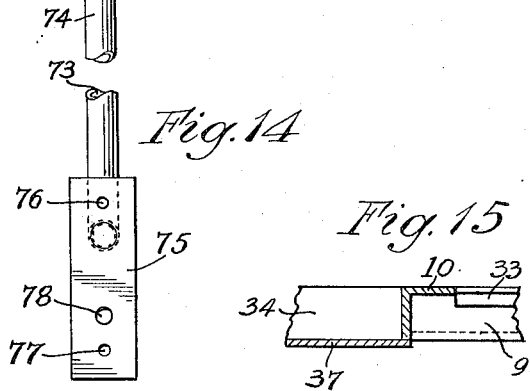
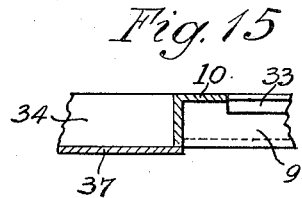
INVENTOR.
Frank J. Zorc, Jr.
BY Hans W. Hefter
ATTORNEY Nov. 20, 1945.  F. J. ZORC, JR  2,389,338
BOAT LAUNCHING TRAILER
Filed Feb. 26, 1945  4 Sheets-Sheet 2
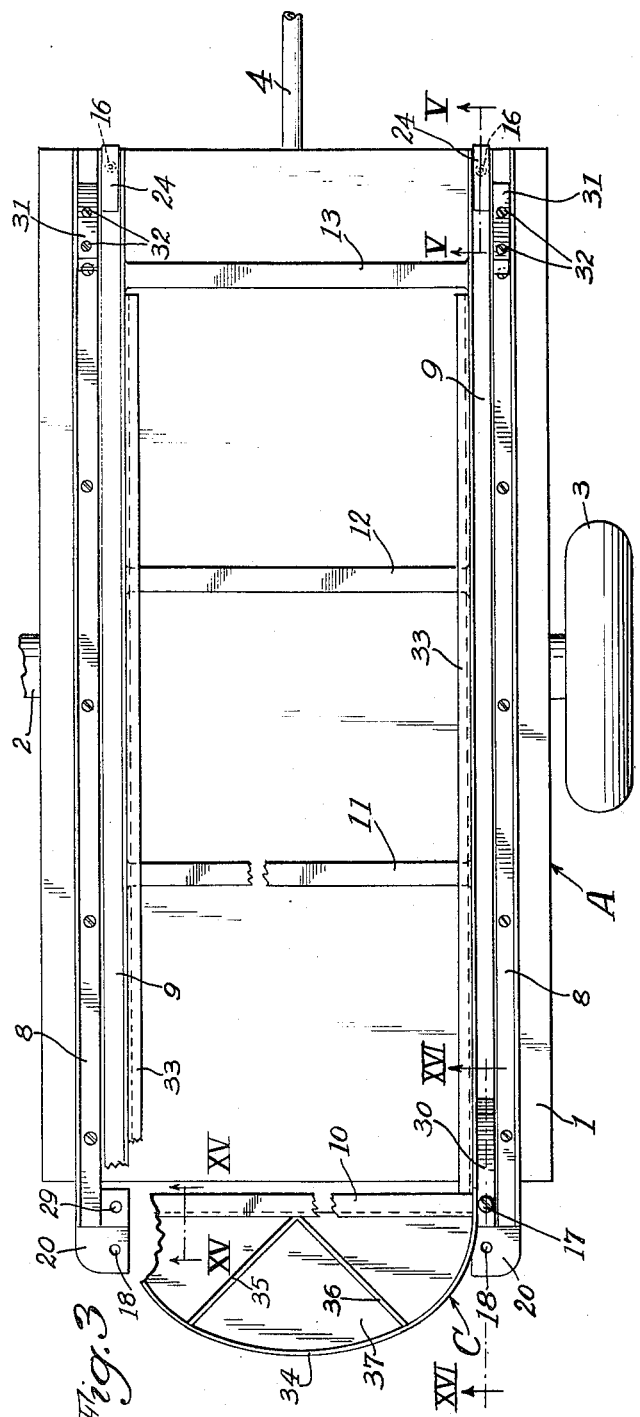
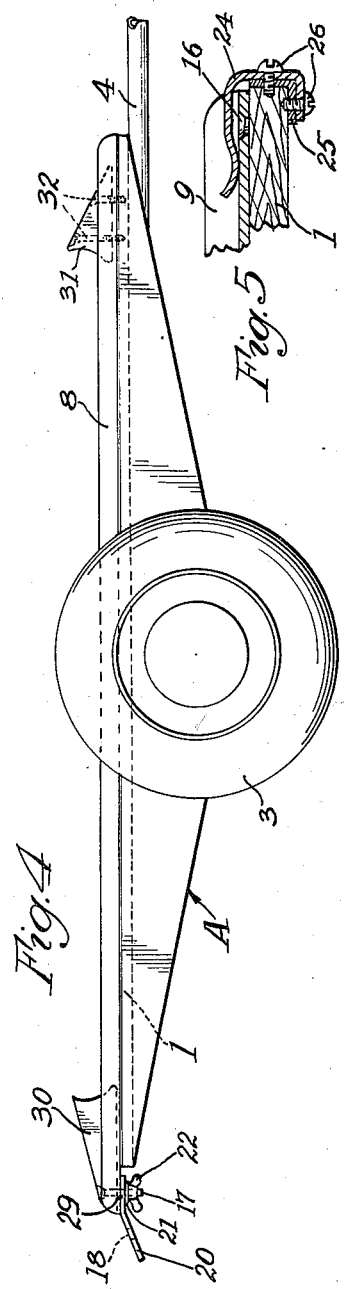
INVENTOR.
Frank J. Zorc, Jr.
BY Hans W. Hefter
ATTORNEY

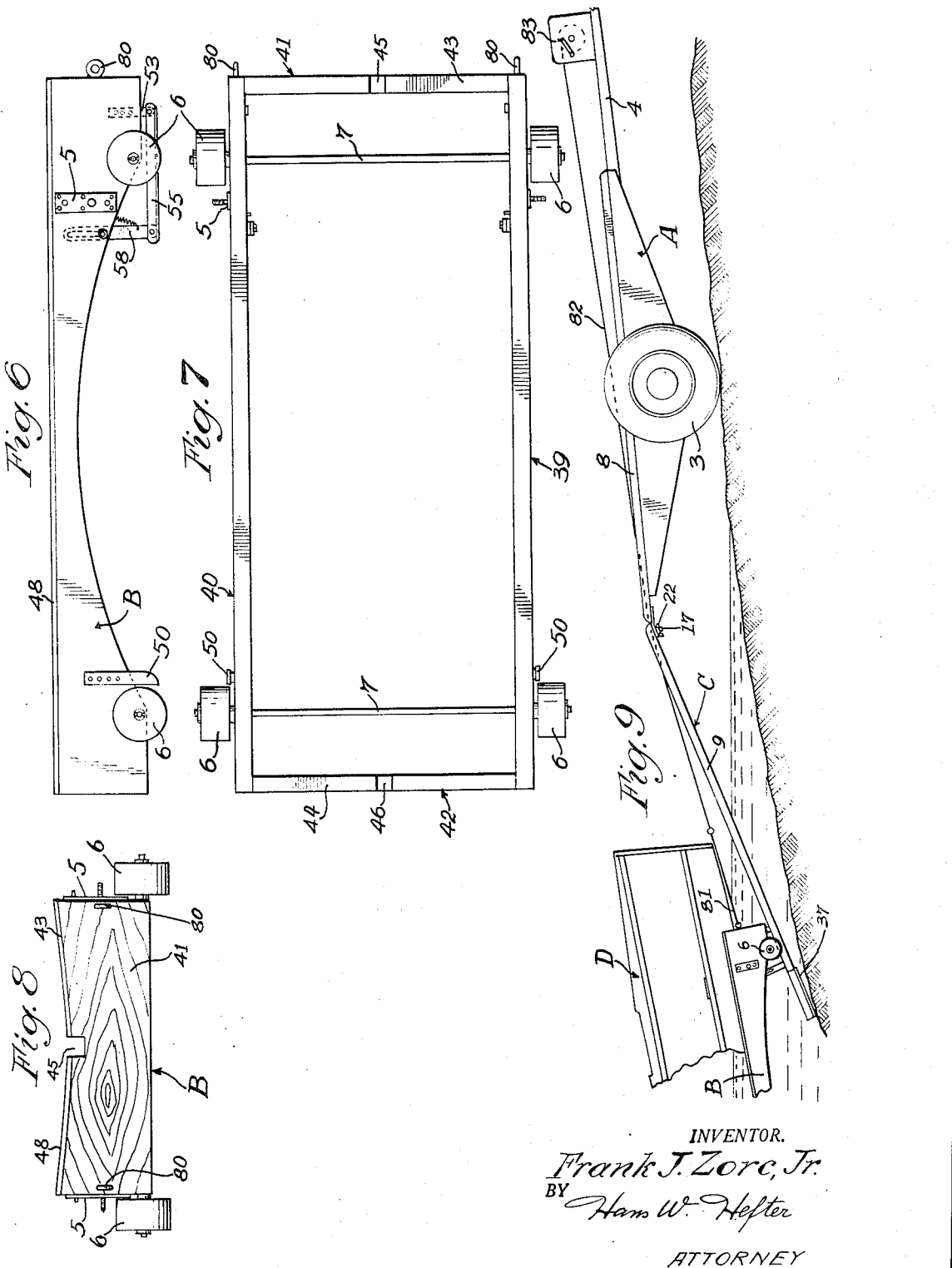

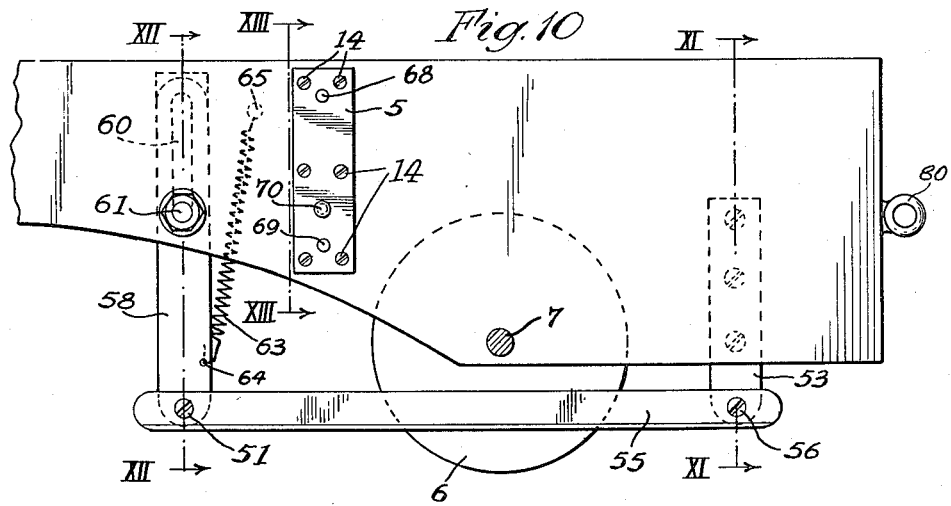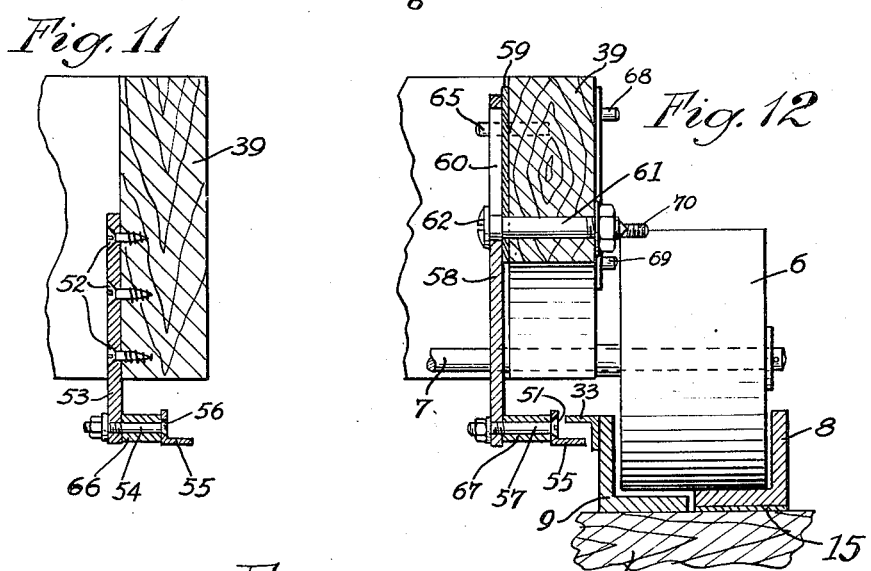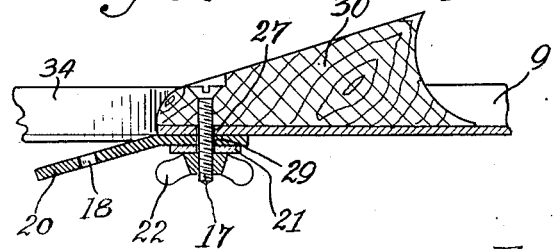

Patented Nov. 20, 1945

2,389,338

UNITED STATES PATENT OFFICE 2,389,338

BOAT LAUNCHING TRAILER

Frank J. Zorc, Jr., Waukegan, Ill.

Application February 26, 1945, Serial No. 579,843

16 Claims. (Cl. 214—85)

The invention relates to boat launching and retrieving apparatus mounted on a trailer having wheels, so that the trailer may be attached to a transporting vehicle for conveying a boat over land to a lake, river, or other body of water.

It is an object of my invention to provide a boat supporting trailer with means for easily and quickly launching the boat and for reloading it on the trailer to transport the boat over land again. The trailer of my invention is provided with a platform, which is mounted on an axle provided with traction wheels, a boat carrier with four wheels supported on said platform, and a ramp which is adapted to be attached to the rear end of the trailer to guide the boat carrier off the platform and into the water or onto the ground. The ramp, in its inoperative position, is stored away on top of the platform and below the boat carrier thereon.

Another object of the invention is to provide the platform with rails for supporting and guiding the wheels of the boat carrier and to provide a ramp which may be stored away between the rails on the platform. The ramp is also provided with rails which, when the ramp is attached to the rear end of the trailer, form a track for the wheels of the boat carrier when the latter travels off the platform during the boat launching operation, or is moved upwardly on the ramp to return the boat carrier to the platform.

It is another object of the invention to provide the boat carrier with a latching device which prevents the boat carrier from traveling completely off the lower end of the ramp and holds the boat carrier, which may be subjected to strong water currents or waves when in the water, substantially in proper alinement with the ramp, so that the boat carrier, without or with the boat thereon, may be pulled without trouble, smoothly upwardly on the ramp and onto the platform of the trailer.

Still another object of the invention is the provision of guide rods mounted detachably on the boat carrier so as to extend upwardly above the highest point of the boat on the carrier. These guide rods project from the surface of the water, when the boat carrier is below the water level, and permit a proper positioning of the boat on the carrier just prior to pulling the boat carrier with the boat thereon out of the water and back onto the platform of the trailer.

Other and further objects and novel features of the invention will be apparent from the following detailed description thereof taken in connection with the accompanying drawings, in which Fig. 1 is a side elevation view of the boat launching trailer with a boat loaded thereon, ready to be conveyed by a transporting vehicle.

Fig. 2 is a rear view of the boat launching trailer, partly in section.

Fig. 3 is a top plan view of the boat launching trailer with the boat carrier removed and parts broken away.

Fig. 4 is a side elevation view of the trailer, the boat carrier and ramp being removed.

Fig. 5 is a detail sectional view on the line V—V of Fig. 3.

Fig. 6 is a side elevation view of the boat carrier.

Fig. 7 is a top plan view of the boat carrier.

Fig. 8 is a front elevation view of the boat carrier.

Fig. 9 illustrates the operative position of the boat launching apparatus, with the boat carrier in the water and the boat about to float off the boat carrier.

Fig. 10 illustrates in an enlarged scale and in a side elevation view the launching mechanism at the front end of the boat carrier.

Figs. 11 and 12 are sectional views on line XI—XI and XII—XII respectively of Fig. 10.

Fig. 13 is a sectional view on the line XIII—XIII of Fig. 10 and shows in section one of the guide rods adapted to be attached to the boat carrier.

Fig. 14 is a view of the guide rod assembly on the line XIV—XIV of Fig. 13.

Figs. 15 and 16 are detail sectional views on the line XV—XV and XVI—XVI, respectively, of Fig. 3 and Fig. 17 is a top plan view of a stop plate attached to the boat.

Referring more particularly to the drawings, the trailer A comprises a platform 1 attached to an axle 2 provided with two traction wheels 3 and a drawbar 4. A boat carrier B, comprising a rectangular frame provided with four wheels 6 on two axles 7, is mounted on the platform 1. The latter is provided on its top surface with a pair of spaced parallel angle iron rails 8, having their angles facing each other, for supporting and guiding the wheels 6 and serving as tracks for the same. A ramp C having two angle iron rails 9 held parallel and in spaced relation to each other by cross bars 10, 11, 12 and 13 is adapted to be attached to the rear of the trailer A (Fig. 9) to serve as a track for guiding the boat carrier B off the platform 1 and into the water or onto the ground. In its inoperative position the ramp C is stored on top of the platform 1 and between the angle iron rails 8 which are fixedly attached to said platform.

It will be noted, particularly from Fig. 2, that the angle iron rails 9 have their angles facing the angles of the adjacent rails 8, forming a channel-like structure, and that the wheels 6 of the boat carrier B are substantially twice as wide as the flange of one of the angle iron rails 8 or 9 and substantially fill out the width of this channel structure. The Figs. 2 and 12 also show that spacer strips 15 are placed under the outer rails 8, so that when the ramp C after use is pushed onto the platform 1 the horizontal flanges of the inner angle irons 9, which form tracks for the wheels 6 when the boat carrier B travels off the trailer A, will slide under the wheels 6, resting on the outer rails 8, without any jamming or binding.

When the boat D is mounted on the carrier B and the latter is loaded on the trailer A, the carrier B rests with the outer half of its wheels 6 on the inner faces of the inwardly directed horizontal flanges of the platform rails 8, the vertical flanges of these rails 8 preventing a lateral shifting of the carrier B with respect to the platform 1. When the carrier B travels off the platform 1 and onto the ramp C the inner half of the relatively wide wheels 6 will engage the inner faces of the outwardly directed horizontal flanges of the ramp angle iron rails 9, the vertical flanges of the last named rails 9 preventing a lateral displacement of the boat carrier B during its movement on the ramp C.

In order to attach the ramp C detachably to the rear of the trailer A, the forward end of each ramp rail 9 is provided with a countersunk hole 16 for receiving the head of a bolt 17 which passes through this aperture 16 and a corresponding aperture 18 in a plate 20 secured by welding or the like, to the rear end of each platform rail 8, which rear end projects, as shown in Figs. 3 and 4, from the rear edge of the platform 1. A washer 21 and a wing nut 22 are placed on each bolt 17 to secure the ramp C readily detachable to the plates 20 which are welded to the bottom face of the horizontal flange of the angle iron rails 8. Upon removal of these bolts 17, the ramp C may be easily pushed onto the platform 1 between the rails 8 until the front ends of the ramp rails 9 are engaged by spring steel clamps 24 attached to the front edge of the platform 1 as shown in Fig. 5. This Figure 5 shows that the edge of the platform 1, which may be made of plywood or the like, is preferably reinforced by angle iron bars 25 to which the clamps 24 may be attached by means of screws 26. The rear ends of the ramp rails 9 are provided each with an aperture 27, which when the ramp C has been engaged by the clamps 24, are in alinement with a second aperture 29 in the plates 20. The bolts 17 are now passed through suitable holes in rear stop blocks 30 loosely placed on the rails 9 and through the alined apertures 27 and 29 (Fig. 16), and after application of the washers 21 and the wing nuts 22 to the bolts 17, the rear end of the ramp C is safely secured to the rails 8 which are fixed to the platform 1, together with the blocks 30 which engage the rear wheels 6 of the boat carrier B. Other blocks 31, adapted to engage the front wheels 6 of the boat carrier B, are preferably fixedly secured each by two bolts 32 to the front ends of the angle iron rails 8 as shown particularly in Figs. 3 and 4.

Referring now particularly to Fig. 3, it will be noted that the rear end of the ramp C is formed by a curved flat iron rail 34, the ends of which are secured by welding to the ends of the vertical flanges of the angle iron rails 9. Additional diagonally extending braces 35 and 36 secure the rail 34 in position, and a plate 37 covers the entire area embraced by the curved rail 34 by being welded to the lower edges of the members 10, 34, 35 and 36. As will appear hereinafter, the rail 34 assists the rear wheels 6 of the boat carrier B to properly engage the angle iron rails 9 when the boat carrier B is pulled upward on the ramp B. Furthermore, a small angle iron bar 33 is attached, as by spot welding, to the outer face of the vertical flange of each of the two angle iron rails 9. The bars 33 extend from the rear cross bar 10 to the front cross bar 13 as shown in Fig. 3. Figs. 2 and 12 show that the bar 33 is attached with its vertical flange directed downwardly to the upper portion of the vertical flange of the ramp bar 9, with the horizontal flange of the angle iron bar 33 directed inwardly and lying in the same plane as the upper edge of the vertical flange of the ramp bar 9. The angle iron bars 33 are provided for cooperating with latching devices attached to the boat carrier B as will be described presently in connection with a more detailed description of this boat carrier.

The boat carrier B, as disclosed in Figs. 6, 7 and 8, consists substantially of a rectangular wooden frame composed of two side members 39 and 40 and two end members 41 and 42. The upper edge of the frame is fashioned to conform to the shape of the hull of the boat to be carried. Both end members 41 and 42 are suitably recessed as shown at 43 and 44 respectively, and have a centrally located notch 45 and 46 respectively, for accommodating with sufficient clearance the keel of the boat. Preferably, the entire upper edge of the frame which engages the hull of the boat is provided with a cushioning strip or pad 48 of rubber or the like, so as to prevent any damage to the exterior finish of the boat. Each side member 39 and 40 of the boat carrier frame has attached on its outer vertical face just in front of the rear wheel 6 a guide bar 50, which projects downwardly from the lower edge of the frame. These guide bars 50 are provided for engaging the outer face of the curved rail 34 on the rear end of the ramp C when the boat carrier B is pulled upwardly on the ramp C and to thereby guide the rear wheels 6 properly onto the ramp rails 9.

Referring now to Figs. 10, 11 and 12 which disclose the details of the latching device associated with the boat carrier B, it is to be noted that two of these latching devices are employed, one on each side of the boat carrier; however, only one will be described, because both are of the same construction. The front end of side member 39 has attached to its inner face, as by screws 52, a flat iron bracket 53 which extends downwardly from the lower edge of the side member 39 and has pivotally attached to its lower end by means of a bolt 54 an angle iron latch rail 55 extending normally substantially parallel to the side member and directly below the same. The countersunk head 56 of the bolt 54 is flush with the inner face of the vertical flange of the angle iron latch rail 55 (Fig. 11). The horizontal flange of the latch rail 55 extends outwardly so as to be positioned under the inwardly projecting flange of the angle iron bar 33 attached to the inner rail 9 of the ramp C when the latter is in its inoperative position on the platform 1 (Fig. 12) or when the boat carrier B travels downward on the ramp C. The rear end of the latch rail 55 is pivotally attached by a bolt 57 to the lower end of a guide bar 58, the upper end of which engages slidably a bearing plate 59 attached to the inner face of the side member 39. The countersunk head 51 of the bolt 57 is flush with the inner face of the vertical flange of the latch rail 55 as shown in Fig. 12. The upper end of the guide bar 58 is provided with a lengthwise extending slot 60 (Fig. 10) through which extends a bolt 61 fixedly attached to the side member 39, the head 62 of the bolt 61 holding the bar 58 in sliding engagement with the bearing plate 59. A helical spring 63 attached with one end to the lower end of the guide bar at 64 and with its other end to a pin 65 on the inner face of the side member 39 normally pulls the guide bar 58 upwardly until the lower end of the slot 60 engages the bolt 61. In this position the latch rail 55 is substantially parallel with respect to the lower edge of the boat carrier frame as shown in Fig. 10. Spacer bushings 66 and 67 on the pivot bolts 54 and 57 respectively, are employed to locate the latch rail 55 in its proper lateral position with respect to the cooperating angle iron bar 33 as shown in Figs. 11 and 12. The rear ends of the latch rails 55 are positioned rearward of the front wheels 6 of the boat carrier, and when the latter moves downwardly on the ramp C, its movement with respect to the ramp C will be stopped when the rear ends of the latch rail 55 engage the rear cross bar 10 of the ramp C. In this position the front wheels 6 of the boat carrier B are still in engagement with the inner horizontal faces of the ramp angle iron rails 9 and remain in this position as shown in Fig. 9. Owing to the slots 60 in the guide bars 58, plus the buoyancy of the boat carrier, the latter will assume a substantial horizontal position in the water.

In order to free the boat from its floating carrier B, the rear end of the carrier is pushed with a paddle or the like downwardly. Any lateral forces which tend to bring the boat carrier B out of alinement with the ramp C or even attempt to separate the boat carrier B from the ramp C are being resisted to by the particular arrangement and construction of the latching devices.

Both side members 39 and 40 of the boat carrier B have fixedly attached to their outer faces immediately behind the front wheels 6 an adapter plate 5 (Figs. 10 and 13) for the detachable mounting of guide bar assemblies which are used only and attached to the boat carrier B only during the retrieving operation of the boat. The adapter plate 5 is secured to the side member 39 and 40 by countersunk screws 14, and, as particularly shown in Fig. 10, is provided with two vertical spaced and outwardly projecting guide pins 68 and 69 and between the same with a threaded stud 70 adapted to receive a washer 71 and a wing nut 72. Each guide bar assembly (Figs. 13, 14) comprises a rectangular mounting plate 75 attached fixedly to the short end of an angularly bent rod 73 whose longer end extends upwardly and preferably a suitable distance above the highest point of the boat when the latter is mounted on the boat carrier B. The entire rod 73 is preferably covered by a rubber sleeve 74 or the like, to prevent any damage to the boat when the same is guided between the two guide bars to be reseated on the boat carrier B. The mounting plate 75 is provided with two apertures 76 and 77 for slidably receiving the guide pins 68 and 69 respectively, and with an aperture 78 permitting an easy passage of the threaded stud 70. It will be understood that the entire guide bar assembly is held securely in place on the boat carrier B by a single wing nut 72 and may be quickly removed by removing this wing nut from the threaded stud 70.

The front end of the boat carrier frame has attached thereto two eye bolts 80 to which two cable lengths 81 are connected, which in turn are attached to a single cable 82 wound upon a manually operable winch 83 attached to the forward end of the drawbar 4.

In the transporting position of the boat launching trailer the boat D and the carrier B are preferably held down onto the platform 1 by at least two straps 84 and 85 which pass over the top of the boat and are tightened by conventional buckles or the like. The guide rod assemblies 73, 74, 75 preferably are removed during launching and transporting over land. Fig. 1 illustrates merely the position of these assemblies with respect to the boat prior to their removal.

In launching a boat loaded on the boat launching trailer of the present invention, the trailer, while remaining hitched to its transporting vehicle, is backed up to the edge of the water, but not so far that the operator, when attaching the ramp C to the rear of the platform 1, would have to step into the water. Then the rear stop blocks 30 are removed by loosening the wing nuts 22 and pulling out the bolts 17. This operation releases the rear end of the ramp C from its connection with the plates 20 and the ramp C is now free and can be pulled out from its inoperative position between the platform rails 8. The bolts 17 are now inserted into the countersunk holes 16 in the front ends of the ramp rails 9 and through the holes 18 in the plates 20, and after the wing nuts 22 have been replaced the ramp C is ready to guide the boat carrier B downwardly. First, however, the rear end of the ramp is lifted off the ground by a rope attached by a hook to the center of the cross bar 11 and with its other end to the boat hook 90, then the straps 84 and 85 are removed and then the trailer is backed a little farther toward the water edge, approximately until the wheels 3 reach the water, depending upon the steepness of the edge of the shore. Now, the winch 83, normally holding the cable 82 taut, is released, so that the boat carrier B with the boat thereon may roll off the platform 1, onto the ramp C and into the water as shown in Fig. 9. As shown in this embodiment of the invention by way of example, the bow of the boat enters the water first. This manner of launching has been found by experience to be the preferred method, particularly when the water is rough. It is, of course, obvious that if desired, the boat may be launched with the stern entering the water first, without changing the scope of the invention. If two persons desire to use the boat, one of the two may occupy the boat while it runs off the launching apparatus and the other person may be picked up later from the shore or a pier. If only one person launches the boat, a rope attached with one end to the boat and with the other end to a fixed object on the shore or a portion of the launching apparatus permits a retrieving of the boat to the shore after lauching so that the person can enter it without wetting his feet. The boat, when reaching the water, will float off its carrier B, which as explained previously, cannot run completely off the ramp C, but remains with its front wheels 6 in engagement with the ramp rails 9. The boat carrier B, without the boat, may now be pulled out of the water, upward on the ramp C and onto the platform 1 by operating the winch 83.

The reloading of the boat onto the trailer is just as simple as the launching of the same. Before the empty boat carrier B is launched into the water again, the two guide rod assemblies 73, 74, 75 are attached to the adapter plates 5 on the boat carrier B. When the latter is in the water the upper ends of the guide rods 73, 74 project from the surface of the water so that the boat may be rowed or paddled with its stern first between these rods and onto its seat on the boat carrier B. When the boat is backed up to the boat carrier, it is necessary to push the rear end of the buoyant boat carrier B downwardly and under the boat. As the boat is paddled further toward the rods 73, 74 the upward push of the carrier B against the boat D causes its keel to automatically find its position in the notch 46. A person in the boat takes hold of the rods 73, 74 and pulls the boat upon its seat until the stop plates 91 attached to the splash rail of the boat engage the rods 73, 74. This will position the keel of the boat securely in the notches 45 and 46 of the boat carrier B and also will locate the boat for proper balance during travel of the trailer over land. The person then holds on to the rods 73, 74 until the winch 83 has pulled the boat carrier B a sufficient distance out of the water, so that even strong current or waves are unable to dislodge the boat from the same. The boat carrier B with the boat thereon can now be completely pulled by the winch 83 up the ramp C and onto the platform 1 until the front wheels 6 engage the front stop blocks 31. The winch 83 is then locked, and, if desired, the straps 84 and 85 are applied to hold the boat down, and then the trailer A is moved forwardly, at least far enough to pull the ramp C out of the water. Upon removal of the bolts 17, the ramp C can be pushed onto the platform 1 between the angle iron rails 8 thereof until the front ends of the ramp rails 9 are engaged by the clamps 24. The attachment of the rear stop blocks 30 by means of the bolts 17 to the rear ends of the ramp rails 8, which by means of the same bolts 17, are secured to the plates 20 completes the reloading operation. As stated previously, the guide bar assemblies 73, 74, 75 are now removed. They may be stored away either in the transporting vehicle, or on the platform 1. The boat launching trailer is now ready for transporting the boat over land.

The same launching principle can be applied even to larger boats of many tons of weight by using a dual wheeled and dual axled trailer and increasing proportionately in size and strength the essential structural elements such as all angle irons, etc.

While I have illustrated and described a particular embodiment of my invention, modifications thereof will occur to those skilled in the art. I desire it to be understood, therefore, that my invention is not limited to the particular parts and arrangements of the same disclosed, and I intend in the appended claims to cover all modifications which do not depart from the spirit and scope of my invention.

What I claim as new is:

1. A boat launching trailer comprising a wheeled platform, a pair of parallel rails secured in spaced relation on top of said platform, a boat carrier provided with wheels and supported by the latter on said rails, a ramp unit including a pair of parallel rails adapted to be positioned, when inoperative, independent of said boat carrier on said platform and parallel to and between the rails secured to the latter, and means for detachably securing said ramp in its operative position with respect to one end of said platform, whereby the rails of said ramp form a track for the wheels of the boat carrier adapted to guide said boat carrier off the rails on said platform.

2. A boat launching trailer comprising a wheeled platform, a pair of parallel rails secured in spaced relation on top of said platform, a boat carrier provided with wheels and supported by the latter on said rails, a ramp unit including a pair of parallel rails adapted to be moved independently of said boat carrier by a lengthwise sliding movement into its inoperative position, on said platform and parallel to and between the rails secured to the latter, means for detachably securing said ramp in its operative position with respect to one end of said platform, whereby the rails of said ramp form a track for the wheels of the boat carrier adapted to guide said boat carrier off the rails on said platform, and means including a curved rail on said ramp for guiding the wheels of the boat carrier in alinement with the rails of said ramp when the boat carrier is moved upwardly on the ramp to be positioned on the rails on said platform.

3. A boat launching trailer comprising a wheeled platform, a pair of parallel rails fixedly mounted in spaced relation on top of said platform, a boat carrier provided with front wheels and rear wheels and supported by said wheels on said rails, a ramp including a pair of parallel rails and cross bars, the ramp rails being secured in spaced relation to each other by said cross bars, means for detachably securing the front end of said ramp to the rear end of the rails on said platform, whereby the rails of said ramp form a track for the wheels of the boat carrier, said means including removable bolts, one for each ramp rail, said ramp being adapted to be moved independently of said boat carrier by a lengthwise sliding movement into its inoperative position on top of said platform parallel to and between the two rails which are fixed to said platform.

4. A boat launching trailer comprising a wheeled platform, a pair of parallel rails fixedly mounted in spaced relation on top of said platform, a boat carrier provided with front wheels and rear wheels and supported by said wheels on said rails, a ramp including a pair of parallel rails and cross bars, the ramp rails being secured in spaced relation to each other by said cross bars, means for detachably securing the front end of said ramp to the rear end of the rails on said platform, whereby the rails of said ramp form a track for the wheels of the boat carrier, said means including removable bolts, one for each ramp rail, said ramp being adapted to be positioned, when not in use, on top of said platform between the two rails which are fixed to said platform, stop blocks attached to the front ends of the platform rails to be engaged by the front wheels of said boat carrier, and stop blocks for engaging the rear wheels of said boat carrier, said removable bolts being adapted to secure said last named stop blocks and the rear end of the ramp, when the latter is placed on top of the platform, to the rear ends of said platform rails.

5. A boat launching trailer comprising a wheeled platform, a pair of parallel rails mounted on said platform, a boat carrier provided with front wheels and rear wheels and supported by said wheels on said rails, a ramp including a pair of parallel rails adapted to be positioned, when inoperative, on said platform and between the rails mounted on the latter, means for detachably securing said ramp in operative position in which the rails of said ramp form a track for the wheels of said boat carrier when the latter is moved off the rails on said platform, the wheels on said boat carrier being of a width adapted to travel on both said pairs of parallel rails of which the rails mounted on the platform are spaced farther apart from each other than the rails of said ramp.

6. A boat launching trailer comprising a wheeled platform, a pair of parallel rails mounted on said platform, a boat carrier provided with front wheels and rear wheels and supported by said wheels on said rails, a ramp including a pair of parallel rails adapted to be positioned, when inoperative, on said platform and between the rails mounted on the latter, means for detachably securing said ramp in operative position in which the rails of said ramp form a track for the wheels of said boat carrier when the latter is moved off the rails on said platform, and latching means on said boat carrier for preventing the front wheels of the latter from leaving the rear end of the rails of said ramp after the rear wheels of the boat carrier have moved off the rails of said ramp.

7. A boat launching trailer comprising a wheeled platform, a pair of parallel rails mounted on said platform, a boat carrier provided with front wheels and rear wheels and supported by said wheels on said rails, a ramp including a pair of parallel rails adapted to be positioned, when inoperative, on said platform and between the rails mounted on the latter, means for detachably securing said ramp in operative position in which the rails of said ramp form a track for the wheels of said boat carrier when the latter is moved off the rails on said platform, latching means on said boat carrier for preventing the front wheels of the latter from leaving the rear end of the rails of said ramp after the rear wheels of the boat carrier have moved off the rails of said ramp, and means including a curved rail connecting the rear ends of the rails of said ramp for guiding the rear wheels of the boat carrier back onto the rails of said ramp when the boat carrier is moved upwardly on said ramp.

8. A boat launching trailer comprising a wheeled platform, a pair of parallel rails mounted on said platform, a boat carrier provided with front wheels and rear wheels and supported by said wheels on said rails, a ramp including a pair of parallel rails adapted to be position, when inoperative, on said platform and between the rails mounted on the latter, means for detachably securing said ramp in operative position in which the rails of said ramp form a track for the wheels of said boat carrier when the latter is moved off the rails on said platform, latching means on said boat carrier for preventing the front wheels of the latter from leaving the rear end of the rails of said ramp after the rear wheels of the boat carrier have moved off the rails of said ramp, means on the rear end of said ramp for guiding the rear wheels of the boat carrier back onto the rails of said ramp when the boat carrier is moved upwardly on said ramp, said latching means including pivotally mounted members, one on each side of the boat carrier, permitting a limited vertical movement of the rear end of the boat carrier with respect to said ramp, but preventing any substantial lateral displacement of said boat carrier when the rear end of the same has moved off the ramp.

9. A boat launching trailer comprising a wheeled platform, a pair of parallel rails secured in spaced relation on top of said platform, a boat carrier provided with wheels and supported by the latter on said rails, a ramp including a pair of parallel rails adapted to be positioned, when inoperative, on said platform and between the rails secured to the latter, means for detachably securing said ramp in its operative position with respect to one end of said platform, whereby the rails of said ramp form a track for the wheels of the boat carrier adapted to guide said boat carrier off the platform, and guide rod assemblies detachably secured to the boat carrier and projecting from the surface of the water when the boat carrier is submerged in water and is in a position to receive the boat to be loaded on said platform.

10. In a boat launching trailer, the combination of a wheeled platform, a pair of parallel rails mounted in spaced relation on said platform, a boat carrier provided with wheels and supported by the latter on said rails, a ramp including a pair of parallel rails secured in spaced relation to each other, said ramp being adapted to be positioned, when not in use, on top of said platform between the rails on the latter, means for detachably securing said ramp to one end of the rails on said platform, whereby the ramp rails form a continuation of the rails on said platform, and cooperating latching members on said boat carrier and said ramp for holding the front end of said boat carrier in engagement and alinement with the rear end of said ramp when the rear end of the boat carrier has run off the rear end of said ramp during the launching operation.

11. A boat launching trailer comprising a wheeled platform, a pair of parallel rails secured in spaced relation on top of said platform, a boat carrier provided with wheels and supported by the latter on said rails, a ramp including a pair of parallel rails adapted to be positioned, when inoperative, on said platform and between the rails secured to the latter, means for detachably securing said ramp in its operative position with respect to one end of said platform, whereby the rails of said ramp form a track for the wheels of the boat carrier adapted to guide said boat carrier off the platform, and guide rod assemblies detachably secured to the boat carrier and projecting from the surface of the water when the boat carrier is submerged in water and is in a position to receive the boat to be loaded on said platform, and cooperating guide members on the rear end of the ramp and on the boat carrier respectively, for guiding the wheels of the boat carrier in engagement with the rails of the ramp when the boat carrier is pulled upwardly on said ramp.

12. In a boat launching trailer, the combination of a wheeled platform, a pair of parallel angle iron rails fixedly secured with one of their flanges in spaced relation to the top of said platform, said flanges being positioned in a common plane and being directed toward each other while the other flanges of said angle iron rails are directed vertically upward, a boat carrier provided with wheels and supported by the latter on the horizontal flanges of said angle iron rails, a ramp including a pair of parallel angle iron rails secured by cross bars in spaced relation, a pair of the flanges of said last named angle iron rails being arranged in a common plane and directed outwardly from the other pair of flanges which is directed vertically upwardly, and means for securing said ramp in a position with respect to said platform in which the wheels of the boat carrier are adapted to engage the outwardly directed flanges of the ramp rails when the boat carrier is moved off the platform, said ramp in its inoperative position being adapted to be stored on top of the platform between the two angle iron rails fixedly attached to the latter.

13. In a boat launching trailer, the combination of a wheeled platform having fixedly secured on its top surface a pair of parallel angle iron rails in spaced relation with one of their flanges, said flanges being arranged in a common plane and directed toward each other, while the other flanges of said angle iron rails are directed vertically upwardly, a boat carrier provided with front wheels and rear wheels and supported by said wheels on the inner faces of the flanges of said rails which are secured to the platform, a ramp including a pair of parallel angle iron rails secured by cross bars in spaced parallel relation to each other, a pair of the flanges of said last named angle iron rails being positioned in a common plane and directed outwardly from the other pair of flanges which is directed vertically upwardly, a curved rail connecting the rear ends of the vertical flanges of said ramp rails with each other, means for detachably connecting the front ends of said ramp rails to the rear ends of the angle iron rails on said platform, whereby the wheels of the boat carrier will engage the inner faces of the outwardly extending flanges of the ramp rails when the boat carrier is moved off the platform rails, latching means on said boat carrier for preventing the front wheels of the latter from leaving the rear ends of the ramp rails when the boat carrier travels downward on the ramp, and guide members on the rear end of the boat carrier and adapted to engage slidably the curved rail at the rear end of the ramp for guiding the rear wheels of the boat carrier in engagement with the outwardly extending flanges of the ramp rails when the boat carrier is caused to move upwardly on the ramp.

14. A boat launching trailer as claimed in claim 13, in which said latching means includes pivotally mounted angle iron bars, one on each side of said boat carrier, means limiting the pivotal movement of said angle iron bars in a vertical plane, and means on said ramp rails forming a flange overlying a flange on said angle iron bars, so as to prevent a separation of the boat carrier from the ramp, but permitting a limited vertical movement of the rear end of the boat carrier with respect to said ramp, one of said cross bars, namely, the one at the rear end of said ramp, acting as a stop for said boat carrier when the pivotally mounted angle irons on the latter engage said cross bar.

15. A boat launching trailer as claimed in claim 13, including resilient clamp means at the front end of the platform for engaging the front ends of the ramp rails when the ramp is placed on top of the platform, stop blocks fixedly attached to the front ends of the angle iron rails fixed to the platform for engaging the front wheels of said boat carrier, removable stop blocks for engaging the rear wheels of said boat carrier, and means for securing said removable stop blocks to the ramp rails when the ramp is placed on the platform, said means securing the rear end of said ramp releasably to the rear ends of said platform rails.

16. In a boat launching trailer, the combination of a wheeled platform, a pair of parallel rails mounted in spaced relation on said platform, a boat carrier having side members and provided with wheels, said boat carrier being supported by said wheels on said rails, a ramp including a pair of parallel rails secured in spaced relation to each other, said ramp being adapted to be positioned, when not in use, on top of said platform between the rails on the latter, means for detachably securing said ramp to one end of the rails on said platform, whereby the ramp rails form a track for the wheels of said boat carrier when the latter is moved off the platform, as during the launching operation, two guide rod assemblies detachably secured to said side members of said boat carrier, namely one for each said side member, said guide rod assemblies projecting from the surface of the water when the boat carrier is submerged in the water and is in a position to receive the boat, and stop members attached to the sides of the boat and adapted to engage said guide rod assemblies when the boat has been located on said boat carrier between said guide rod assemblies in a balanced position as required for transport over land.

FRANK J. ZORC, Jr.